(12) United States Patent
Klein (10) Patent No.: US 7,189,143 B2
(45) Date of Patent: Mar. 13, 2007

(54) MACHINE FOR SUPERFINISHING BY HONING

(75) Inventor: Gerhard Klein, Oberboihingen (DE)

(73) Assignee: KADIA Produktion GmbH + Co., Nuertingen (DE)

( * ) Notice: Subject to any disclaimer, the term of this patent is extended or adjusted under 35 U.S.C. 154(b) by 0 days.

(21) Appl. No.: 10/517,276

(22) PCT Filed: Jan. 16, 2003

(86) PCT No.: PCT/EP03/00379

§ 371 (c)(1),
(2), (4) Date: Apr. 16, 2005

(87) PCT Pub. No.: WO03/103896

PCT Pub. Date: Dec. 18, 2003

(65) Prior Publication Data

US 2006/0052038 A1  Mar. 9, 2006

(30) Foreign Application Priority Data

Jun. 10, 2002  (DE) ................. 102 25 514

(51) Int. Cl.
*B24B 51/00* (2006.01)
(52) U.S. Cl. ............... 451/11; 451/76; 451/124
(58) Field of Classification Search ........... 451/27, 451/51, 61, 108, 119, 124, 127, 76, 10, 11; 175/189; 29/888.07
See application file for complete search history.

(56) References Cited

U.S. PATENT DOCUMENTS 3,032,932 A * 5/1962 Bargren ............... 451/124
3,410,028 A * 11/1968 Estabrook ............. 451/1
3,645,048 A 2/1972 Garnier
4,463,490 A 8/1984 Saito et al.
4,832,061 A * 5/1989 Hwang ............... 132/329
5,042,202 A * 8/1991 Klein et al. ........... 451/124
5,095,662 A * 3/1992 Grimm et al. ........... 451/5
6,176,767 B1 * 1/2001 Heijkenskjold ......... 451/262
2001/0018321 A1 8/2001 Heijkenskjold

FOREIGN PATENT DOCUMENTS

| DE | 195 31 507 | 2/1997 |
| DE | 196 46 142 | 5/1998 |
| DE | 100 28 791 | 1/2002 |
| DE | 101 12 883 | 9/2002 |
| EP | 0 893 196 | 1/1999 |

* cited by examiner

*Primary Examiner*—Jacob K. Ackun, Jr.
(74) *Attorney, Agent, or Firm*—Paul Vincent (57) ABSTRACT

A honing machine for super finishing workpieces, e.g. by honing using a tool spindle (7), can be rotatably driven and can receive a tool. A motor rotates the tool spindle, the tool spindle (12) being arranged on a carriage (12), which can be displaced on a machine frame (16), by means of a drive device, in the direction of the rotational axis of the tool spindle. The drive device consists of a flat primary part (13) and a secondary part (17) of an electric linear motor (18), the secondary part being linearly displaceable along the primary part. One (13) of the components primary part/secondary part (13, 17) of the linear motor (18) is disposed on the machine frame (16), and the other (17) on the carriage (12).

7 Claims, 7 Drawing Sheets

MACHINE FOR SUPERFINISHING BY HONING

This application is the national stage of PCT/EP03/00379 filed on Jan. 16, 2003 and also claims Paris Convention priority of DE 102 25 514.8 filed on Jun. 10, 2002.

BACKGROUND OF THE INVENTION

The invention concerns a machine for superfinishing workpieces by honing or precision grinding according to the independent claim.

SUMMARY OF THE INVENTION

Honing machines are used for the above-mentioned tasks. A honing tool is provided with an appropriate coating (e.g. of diamond or corundum) and is introduced into a bore while simultaneously being turned and reciprocated to process the inner surface of the bore. To take into account the wear of the honing tools, these are i.a. designed to have honing strips provided with a honing layer which can be adjusted in a radial direction by means of a widening bar which rotates along with the honing tool but can be displaced therein in an axial direction.

Machines can moreover be used, with which a tool must be mounted to the device in a direction which corresponds to the axial direction of the rotational motion of the machine. These may be honing tools (e.g. for so-called "mandrel honing") and also lapping tools. They could also be precision grinding tools to subject e.g. pre-ground valve seat surfaces to final superfinishing, wherein only a few micrometers must be removed in an exactly defined manner thereby simultaneously improving the surface.

The lifting motion of the carriage supporting the honing spindle of honing machines has generally been conventionally effected via a hydraulic drive, while the rotational motion of the honing spindle and thereby also that of the honing tool disposed therein, is effected by a common electromotor. The simultaneous rotational and lifting motions of the honing tool during honing produces a cross-grinding pattern on the surface to be processed, which is typical for this type of treatment, this pattern being important for the bearing and lubricating properties of the processed workpiece and also for the fitting accuracy of further components (e.g. pistons). For processing smaller bores having a diameter of only a few millimeters and simultaneous increase of the rotational speed of the honing tool to reduce the processing time, the stroke speed must be correspondingly increased. The hydraulic drives used to provide the stroke motion are thereby limited with regard to speed and reversibility of the system during operation. This is particularly true when the strokes are short as is the case when the processing depth of the bores is in the range of a few millimeters.

It is the underlying purpose of the invention to eliminate these disadvantages. In particular, means should be provided for the stroke motion which permit higher stroke speeds while thereby maintaining high reversal accuracy to ensure that small and short bores can also be processed more exactly and rapidly at higher honing tool rotational speeds. This object also addresses the problem of exactly realizing very short delivery paths for the carriage supporting the honing spindle, such as those which occur e.g. during precision grinding of valve seat surfaces. Moreover, the entire construction should be simplified by reducing the number of moving parts thereby also reducing costs.

This object is achieved in accordance with the invention with the elements recited in the claims.

A so-called linear motor is used which permits higher lifting and delivery speeds, has considerably less components, can be reversed with more precision and allows short stroke paths at high speed.

The use as honing machine, i.e. use of a honing tool with radially adjustable honing strips, is facilitated in that the widening bar for radial adjustment of the honing strips, which is actuated by a connecting rod disposed in the honing machine, can also be actuated in a more simplified manner using a servomotor which, in turn, may preferably be flanged coaxially to the coupling housing and disposed as a linear extension to the spindle housing. The connecting rod can also be preferably adjusted via a further linear drive. The invention may then also be used to perform a rapid and precise, minimum, exactly defined, stroke motion of a precision grinding tool, e.g. for processing a valve seat.

BRIEF DESCRIPTION OF THE DRAWING

Embodiments of the invention are described in more detail below with reference to the enclosed drawings.

DESCRIPTION OF THE PREFERRED EMBODIMENT

Figure 1:
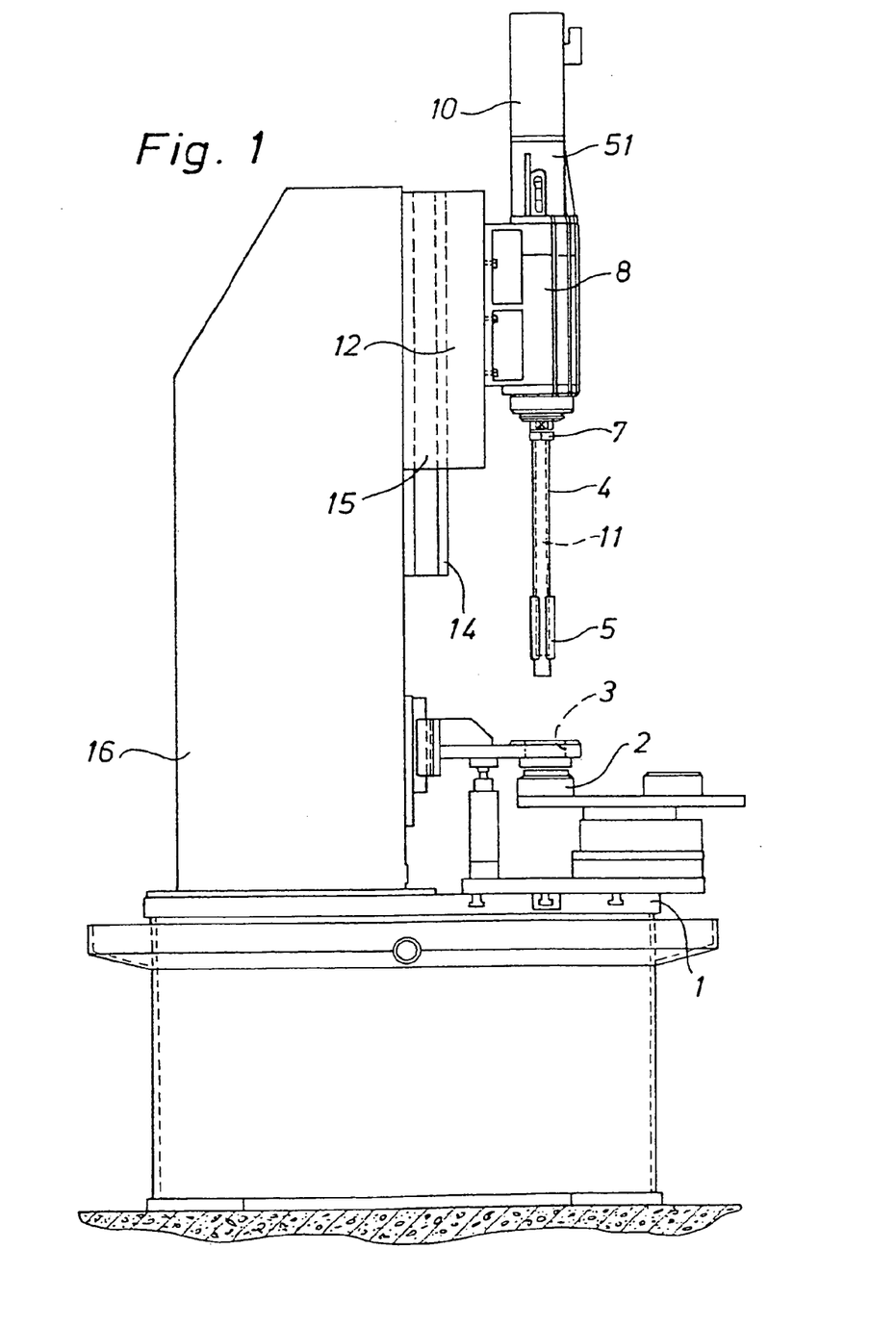
FIG. 1 shows a schematic view of a honing machine which is designed in accordance with an embodiment of the invention.
Figure 2:
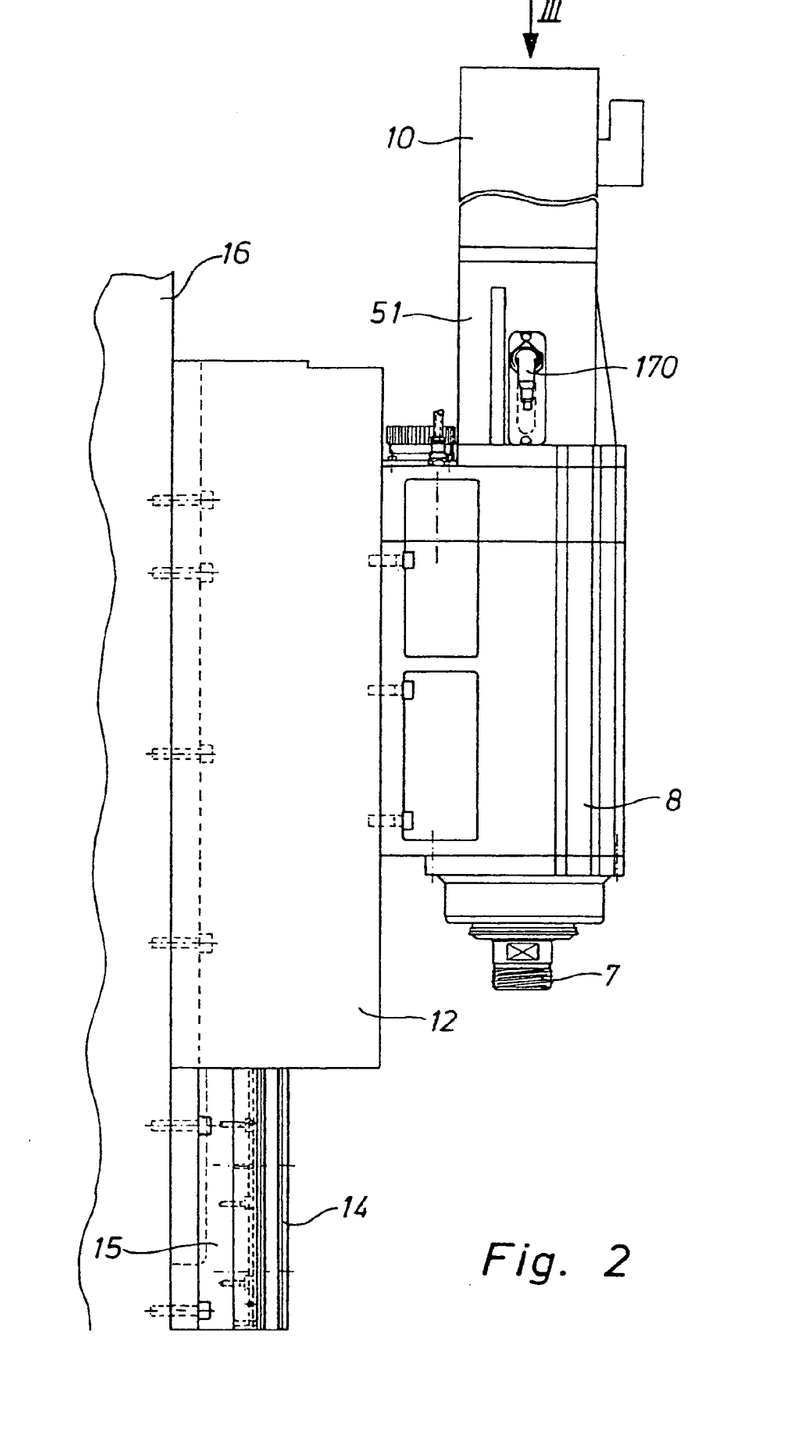
FIG. 2 shows a honing spindle housing 8 of the honing spindle 7, the carriage 12 and the sliding rails 14 as well as the carrier 15 carrying the sliding rails 14 and disposed on the machine frame 16, the view being tilted by 90° with respect to FIG. 1.

FIG. 1 shows a honing machine. A workpiece 2 is clamped on a processing platform 1 for honing a bore 3 thereof. The honing tool 4 which is received in a cone 6 at the end of the honing spindle 7 is lifted and lowered with the honing spindle 7 thereby providing the conventional stroke motion of the honing process, as is part of the honing method. The axial displacement of the honing spindle 7 serves to generate this stroke motion. The honing tool 4 has radially adjustable honing strips 5. The honing spindle 7 is driven by an electromotor 9 which is integrated in the spindle housing 8. A coupling housing 51 is flanged to the upper end (in FIG. 1) of the spindle housing 8, and a servomotor 10 is coaxially flanged to the coupling housing 51. The servomotor 10 provides axial displacement of a widening bar 11 which is disposed in the honing tool 4 and passes through the rotating honing spindle 7 for radial adjustment of the honing strips 5.

The spindle housing 8 is disposed on a carriage 12 in which the primary part 13 of a linear motor 18 is integrated.

Figure 3:
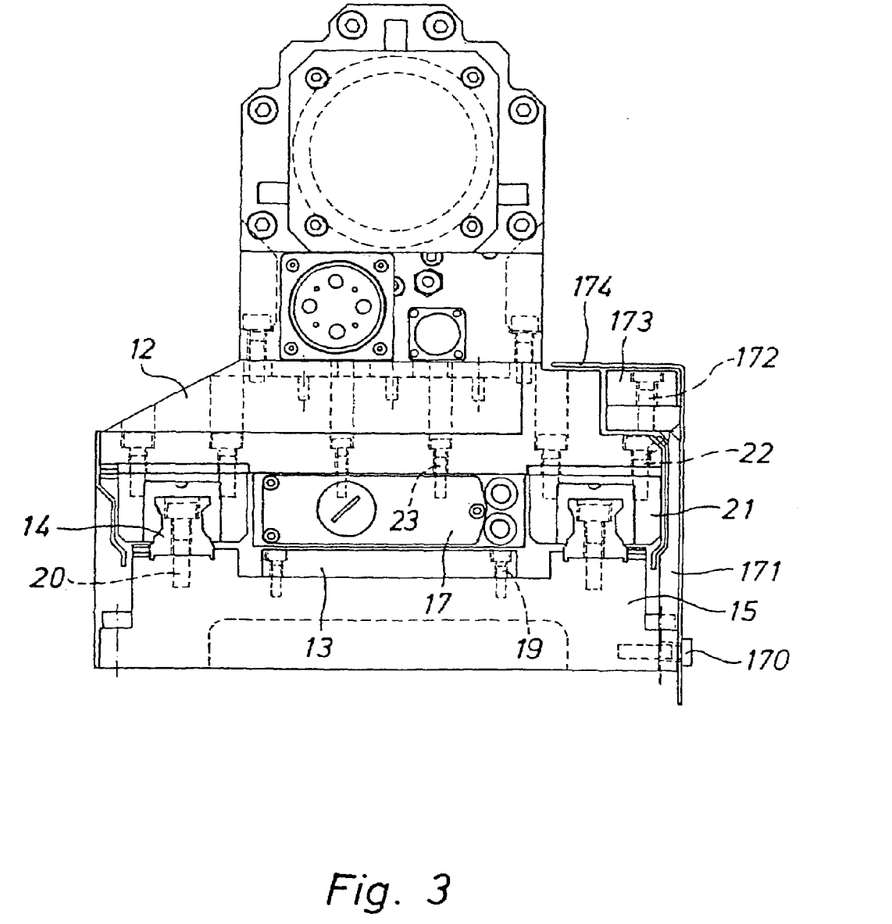
FIG. 3 shows a view in the direction of the arrows III—III of FIG. 2.

The primary part 13 forms a linear motor 18 together with the secondary part 17 which is integrated in the vertically extending carrier 15 (see FIG. 3). This linear motor 18 effects the lifting motion of the spindle housing 8. The carrier 15 is mounted to the machine frame 16. The carriage 12 with Integrated primary part 13 can be lifted and lowered on the sliding rails 14, which, In turn, are fixed to the carrier 15. The primary part 13 is the moving part and the secondary part 17 is the stationary part of the linear motor.

Use of a linear motor whose moving part carries the honing spindle and thereby performs the stroke motion with the required speed and reversal accuracy is of primary importance to the invention. To process the bore 3, the spindle housing 8, including honing spindle 7 and honing tool 4 received therein, is lowered to such an extent that the honing strips 5 penetrate into the bore 3. The honing spindle 8 is simultaneously reciprocated (lifted and lowered) and turned. These two motions are matched to generate the "cross-grinding pattern", which is typical for honing, on the workpiece surface at an angle of e.g. 10° to 50°. For smaller diameters of the bore to be processed and high rotational speeds, this pattern requires a relatively fast lifting and lowering of the honing spindle 8, which is ensured by the linear motor 18. An inventive honing machine with e.g. a stroke of 80 mm can have a stroke speed of 50 m/min with a reversal accuracy of $\leq 0.05$ mm (reversal is the change of motion from one direction to the opposite direction). With a stroke of 20 mm, it can have a stroke speed of 25 m/min with a reversal accuracy of $\leq 0.04$ mm.

As is shown in FIG. 3, the primary part 13 of the linear motor 18 is mounted to the carrier 15 via screws 19 and the sliding rails 14 are mounted to the carrier 15 via screws 20. The profile of the sliding rails 14 corresponds to the profile of the sliding elements 21, which are mounted to the carriage 12 via screws 22. The primary part 13 of the linear motor 18 is mounted in the carriage 12 via screws 23.

The person skilled in the art is familiar with linear motor construction and an exact description is therefore unnecessary herein. Linear motors can be obtained from various manufacturers. They are driving elements which are developed from a normal rotary current electromotor by "cutting open" the stator and unfolding it into a plane. The rotor is also planar such that it moves along the linear extension of the stator in correspondence with the alternating electromagnetic field which propagates along the windings of the stator. In the present case, the primary part 13 corresponds to the stator, the secondary part 17 to the rotor of an electromotor. It is a synchronous device and is designed as a long stator motor. The speed is controlled via frequency variation in a frequency converter of an associated control. A programmable control (not shown) permits adjustment of corresponding speed as stated above.

A carrier frame 171 is mounted on the carrier 15 using screws 170, only one of which is visible, and a measurement transducer 173 is disposed on the carrier frame 171 via screws 172. It contains conventional measurement markings (not shown) which generate measuring signals in sensors (not shown) disposed on the carriage during motion of the carriage 12 perpendicular to the plane of the drawing of FIG. 3, the measuring signals showing the instantaneous position of the carriage 12 and transmitting it to the control (not shown). 174 designates a cover plate.

Figure 4:
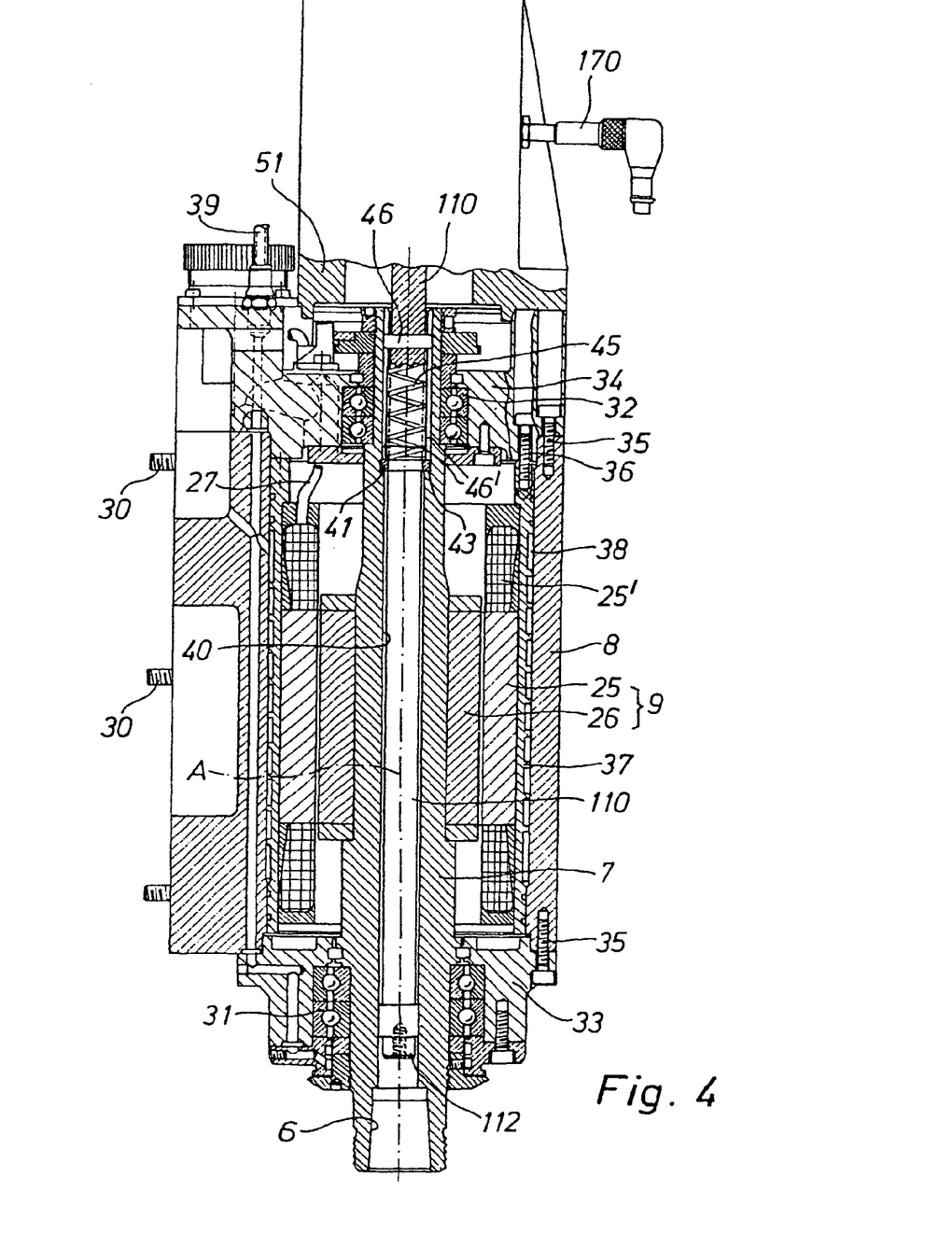
FIG. 4 shows a section through the spindle housing 8.

The structure of the spindle housing 8 is shown in FIG. 4. The electromotor 9 is integrated in the spindle housing 8. It causes rotation of the honing spindle and consists of a stator 25 with windings 25' and rotor 26. The stator 25 is pressed into a sleeve 37 which is screwed to the end plates 33, 34 using screws 36 (only shown at 34). The rotor 26 is pressed onto the outside of the honing spindle 7. The stator 25 is supplied with current via the connections 27. The motor 26 is a permanent magnet. The spindle housing 8 is screwed to the carriage 12 using screws 30. The honing spindle 7 is supported in the spindle housing 8 via bearings 31 or 32 in front and rear end plates 33 and 34. The end plates 33 or 34 are screwed to the spindle housing 8 using screws 35. The sleeve 37 has a spiral cooling channel 38 which is supplied with coolant via the coolant delivery line 39. The coolant discharge is not shown: It is disposed on the opposite side.

Figure 5:
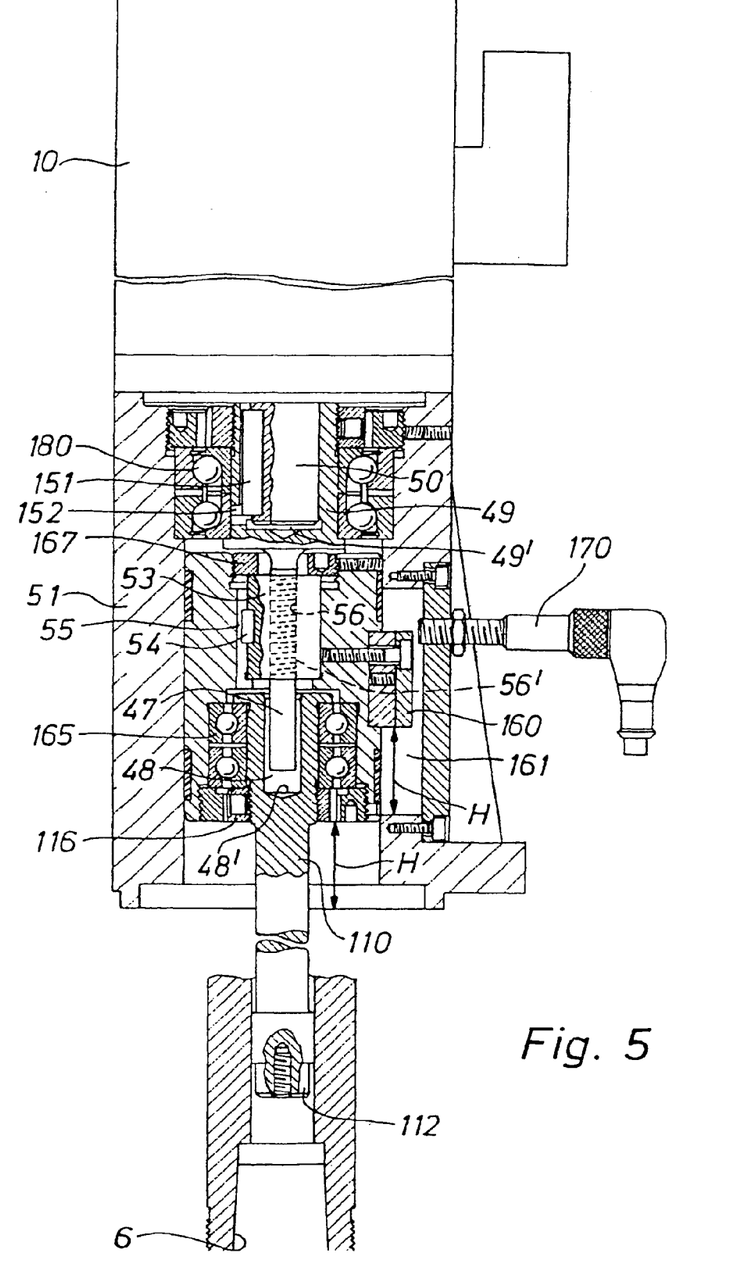
FIG. 5 shows a section through the coupling housing 51 which is flanged to the spindle housing 8.

The radial coupling housing 51 which joins the connecting plate 34 on the left-hand side, and the servomotor 10 which adjusts the widening bar 11 of the honing strips 5 of the honing tool 4 are shown in FIGS. 4 and 5.

The honing spindle 7 has a continuous bore 40 in which the connecting rod 110 is disposed to be displaceable in an axial direction. The lower end of the connecting rod 110 has a bore 112 with inner thread into which the widening bar 11 is rigidly screwed, such that the connecting rod 110 and the widening bar 11 form a unit and can be commonly displaced in the longitudinal direction (axial direction) of the axis of rotation. The honing strips 5 are thereby radially displaced towards the outside. Honing tools 4 of this type are known In the art. During operation, the honing strips are radially pulled inward through springs and have inclined adjustment surfaces on their inner sides which cooperate with correspondingly inclined adjustment surfaces at the end of the widening bar 11 such that, when the widening bar 11 is axially displaced, the honing strips 5 are radially adjusted (spreading mechanism).

The connecting rod 110 and the widening bar 11 rotate together with the honing spindle 7 but can also be axially displaced therein (in the longitudinal direction) as mentioned above. This is realized in that the connecting rod 110 is penetrated by a pin 46 whose ends are guided in opposite grooves 46' in the honing spindle 7. The bore 40 in the honing spindle 7 has a shoulder 43 onto which a ring 41 is urged via a spring 45 which is supported with its other end on the pin 46. At rest, the connecting rod 110 is forced by the spring 45 in its outermost upper position shown in FIG. 4. The connecting rod 110 may then be downwardly displaced against the force of the spring 45.

The plunger 47 is a continuation of a coupling piece 49 into the axial recess 49' of which the driven shaft 50 of the servo motor 10 projects. Coupling in the rotational direction with is realized by a tongue/groove connection formed by a groove 151 and wedge ("spring") 152.

The coupling housing 51 is screwed to the front end plate 34 of the spindle housing 8. The screws are not shown. A sleeve 52 is Inserted into the coupling housing 51. The sleeve 52 can be axially displaced in the coupling housing 51, since a block 160, which is screwed into the sleeve 52 and radially projects past it, projects into a groove 161 in the sleeve 53 and is guided therein. The sleeve 52 can be displaced relative to the coupling housing 51 through a stroke H. The upper end of the connecting rod 110 is rotatably disposed in the sleeve 52 using bearings 165. The inner shells of the bearings 165 are rigidly connected to the connecting rod. A lid 166 is screwed to the connecting rod 110 to fix the bearing 165.

The sleeve 52 also receives an adjusting sleeve 53 which rotates therewith and can be displaced and adjusted in a longitudinal direction. This connection is also realized through a tongue and groove connection which is formed by the wedge 54 and the groove 55. The adjustment sleeve 53 is penetrated by a bore which has an Inner thread 56. An outer thread 56' of the plunger 47 engages therein. The adjustment sleeve 53 is secured in the sleeve 52 through a lid 167 which is screwed to the sleeve 52. When the servomotor 10 and thereby also its driven shaft 50 rotate, the coupling piece 49 is also rotated due to the tongue and groove connection 151, 152. Due to engagement of the threads 56, 56', the sleeve 52 is displaced in an axial direction and the connecting rod 110 together with the widening bar 11 are displaced in a downward direction against the force of the spring 45, thereby effecting radial adjustment of the honing strips 5 within the honing tool 4 as mentioned above.

170 is a sensor having an end switch which transmits the shown end position consisting of sleeve 52, block 160, bearing 165 and connecting rod 110, and a corresponding measured signal to the control (not shown).

Figures 6, 7:
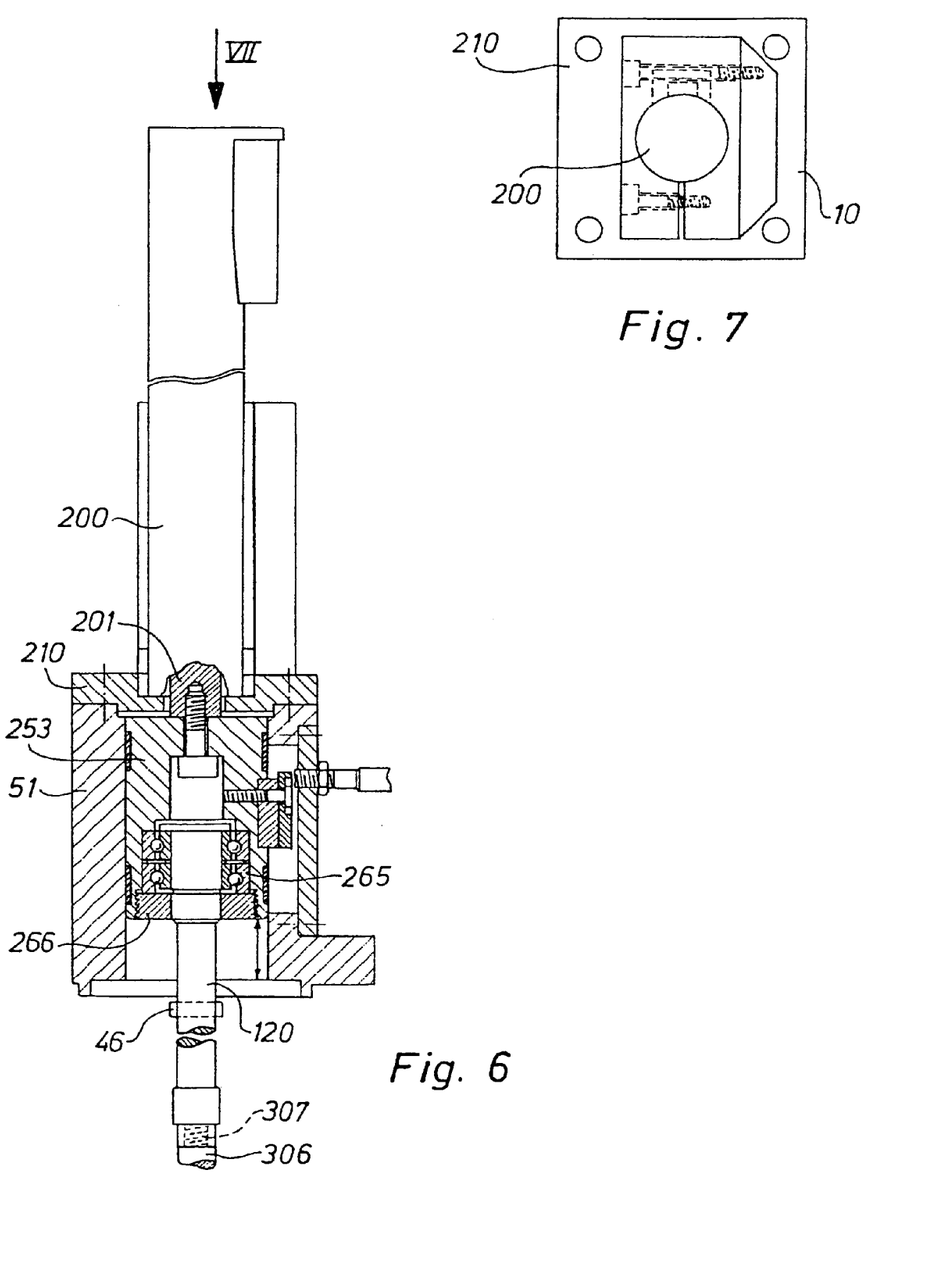
FIG. 6 shows a section through the coupling housing 51 of a second embodiment of the invention which is suited, in particular, for small stroke motion in an axial direction.
FIG. 7 shows a view in the direction of arrows VII—VII of FIG. 6.

A further embodiment is described below with reference to FIGS. 6 and 7. The servomotor 10 is replaced by a linear motor and supplies a superfinishing tool 30 which is disposed at the end of the bar 306. It is connected to the connecting rod 120. The connecting rod 120 is rotatably disposed in the adjustment sleeve 253 using bearings 265, wherein the lid 266 is screwed into the adjustment sleeve 253 such that the connecting rod 120 can be rotated in the adjustment sleeve 253 but not be displaced in an axial direction thereto. The runner, i.e. the movable primary part 201 of a further linear motor 200 is rigidly connected to the adjusting sleeve 253. The linear motor 200 also has a secondary part (not shown). It is a construction type of a linear motor, wherein the runner is round and the inner space of the stator is also round. Such construction types of linear motors are also known per se. It is clear that the use of a linear motor requires much less components, including those for the adjustment motion of the connecting rod 110 and of the bar 306 connected thereto. Moreover, these components are subjected to much less wear. FIG. 7 shows suspension of this further linear motor 200 using a clamping plate 210.

Figure 8:
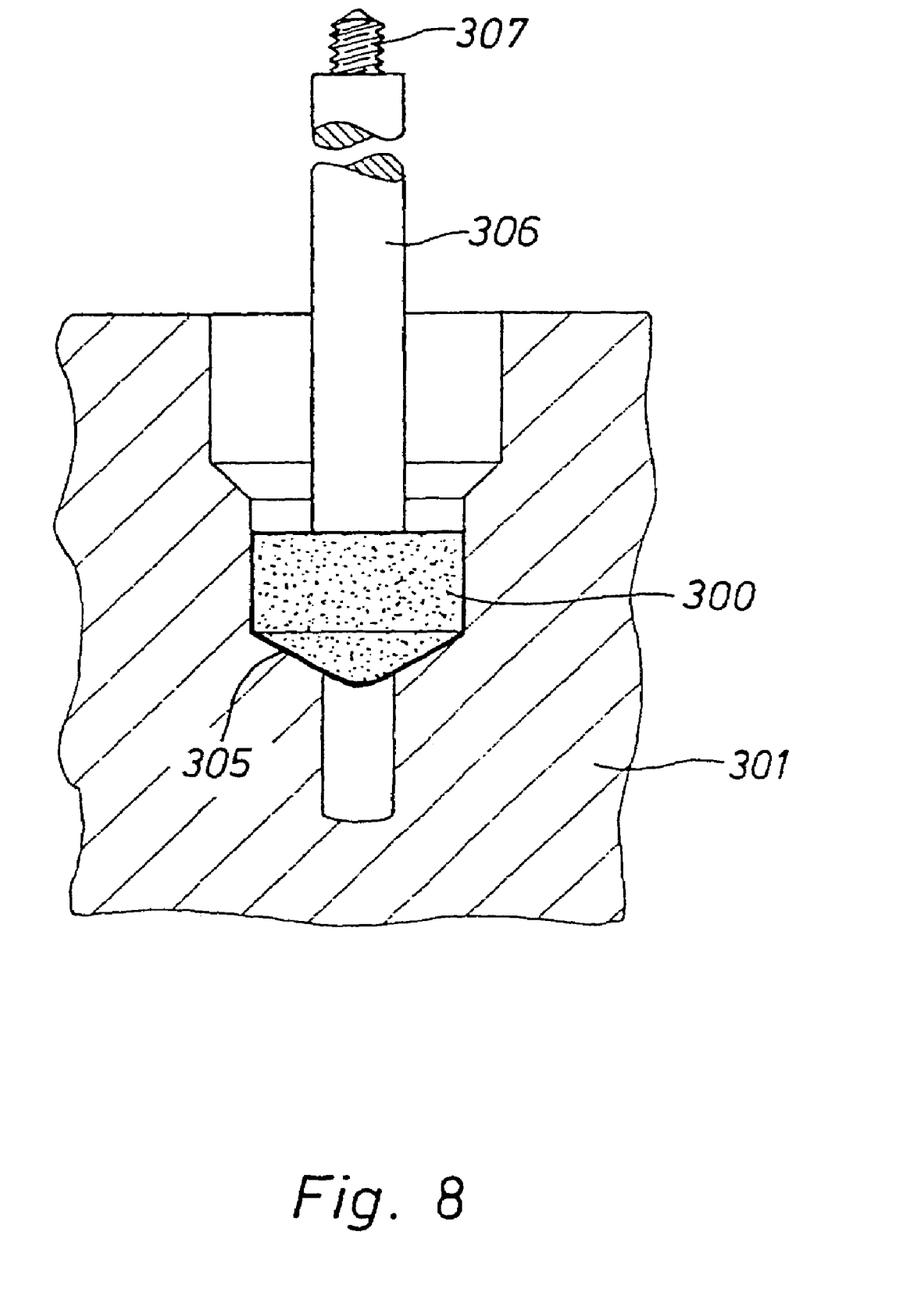
FIG. 8 shows a schematic representation of a workpiece 301 and an associated tool 300 which can be used with the embodiment of FIGS. 6 and 7.

The embodiment with axial delivery of the bar 306 in accordance with FIGS. 6 and 7 addresses a processing task which is explained by means of FIG. 8. The tool is a conical precision grinding body 300 which serves for processing a valve seat surface 305. The valve seat surface 305 must thereby be removed by a defined amount, e.g. a few hundredths of a millimeter, which is calculated e.g. using a sensor. The shape and surface must be simultaneously improved. The conical precision grinding body 300 is disposed on the bar 306 which has a threaded pin 307 at its end which is connected to the end of the connecting rod 120. In this manner, minimum stroke paths can be realized by means of the servomotor 10 or the further linear motor 200. This may be effected either with one stroke motion or several small stroke motions which are intermittently applied, e.g. for sparking out after only relatively few rotations or for rinsing with coolant after each stroke.

I claim:

1. A machine for superfinishing a workpiece through honing or precision grinding, the machine comprising:
   a spindle housing;
   a honing spindle disposed in said spindle housing;
   a first electromotor having a stator integrated In said spindle housing and a rotor borne for rotation within said stator, said rotor surrounding and rotating said honing spindle;
   a linear motor having a moving part bearing said spindle housing for controlling a stroke motion of said honing spindle;
   a bar disposed within said honing spindle for rotation therewith; and
   a second electromotor coaxially flanged to an end of said spindle housing, said second electromotor communicating with said bar for axial displacement thereof to widen a honing tool disposed on said honing spindle or to carry a grinding body.

2. The machine of claim 1, wherein said second electromotor comprises a driven shaft which engages in a coupling piece and rotates same, said coupling piece comprising a plunger provided with an outer thread which engages in an inner thread of an adjusting sleeve which is axially displaced upon rotation of said coupling piece due to engagement of said inner and outer threads and to which a further sleeve is connected for axial displacement within a transmission housing without rotating, wherein a connecting rod which can be connected to said bar is rotatably disposed in said further sleeve.

3. A machine for superfinishing a workpiece through precision grinding with a grinding body, the machine comprising:
   a spindle housing;
   a spindle disposed in said spindle housing;
   a first electromotor having a stator integrated in said spindle housing and a rotor borne for rotation within said stator, said rotor surrounding and rotating said spindle;
   a first linear motor having a moving part bearing said spindle housing for controlling a stroke motion of said honing spindle;
   a bar disposed within said spindle for rotation therewith; and
   a second linear motor for axial displacement of said bar, wherein an end of said bar cooperates with the grinding body.

4. The machine of claim 3, wherein said second linear motor has a runner and stator which are round, wherein said runner is disposed in said stator to communicate with said bar.

5. A machine for superfinishing a workpiece through honing or precision grinding, the machine comprising:
   a spindle housing;
   a honing spindle disposed in said spindle housing;
   a first electromotor having a stator Integrated in said spindle housing and a rotor borne for rotation within said stator, said rotor surrounding and rotating said honing spindle;
   a linear motor having a moving part bearing said spindle housing for controlling a stroke motion of said honing spindle;
   a bar disposed within said honing spindle for rotation therewith; and
   means for axial displacement of said bar to widen a honing tool disposed on said honing spindle or to carry a grinding body, wherein said first electromotor and said linear motor are disposed, structured, and dimensioned to generate a stroke length of 80 mm at a stroke speed of up to 50 m/min with a reversal accuracy of $\leq 0.05$ mm and to generate a stroke length of 20 mm at a stroke speed of up to 25 m/min with a reversal accuracy of $\leq 0.04$ mm.

6. The machine of claim 5, wherein the machine generates a cross grinding pattern on a surface of the workpiece having an angle of more that 10°.

7. The machine of claim 6, wherein the machine generates a cross grinding pattern on a surface of the workpiece having an angle of less than 50°.

* * * * *